US009380068B2

(12) United States Patent
Iyer et al.

(10) Patent No.: US 9,380,068 B2
(45) Date of Patent: Jun. 28, 2016

(54) MODIFICATION OF COMPUTING RESOURCE BEHAVIOR BASED ON AGGREGATED MONITORING INFORMATION

(71) Applicant: Bank of America Corporation, Charlotte, NC (US)

(72) Inventors: Shankar Ramasubramanian Iyer, East Windsor, NJ (US); Edison M. Castro, Lawrenceville, NJ (US); Dhrumit Desai, Lawrenceville, NJ (US); Sangappa Galagali, Plainsboro, NJ (US); Navanith R. Keerthi, Lawrenceville, NJ (US); Ramesh Pichaiyan, Newtown, PA (US); Maria Auxilia Dominique, Kendall Park, NJ (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 14/462,183

(22) Filed: Aug. 18, 2014

(65) Prior Publication Data

US 2016/0050222 A1  Feb. 18, 2016

(51) Int. Cl.
*H04L 29/06*  (2006.01)

(52) U.S. Cl.
CPC ............ *H04L 63/1416* (2013.01); *H04L 63/20* (2013.01)

(58) Field of Classification Search
USPC ................................................. 726/1, 13, 25
See application file for complete search history.

(56) References Cited

U.S. PATENT DOCUMENTS

| 5,222,197 A | 6/1993 | Teng et al. |
| 5,886,744 A | 3/1999 | Hannah |
| 5,905,374 A | 5/1999 | Westberg et al. |
| 6,336,139 B1 | 1/2002 | Feridun et al. |
| 6,629,106 B1 | 9/2003 | Narayanaswamy et al. |
| 6,914,948 B2 | 7/2005 | Kuki et al. |
| 7,627,544 B2 | 12/2009 | Chkodrov et al. |
| 7,657,764 B2 | 2/2010 | Jorgenson et al. |

(Continued)

OTHER PUBLICATIONS

"Monitoring and Autoscaling IaaS Clouds: A Case for Complex Event Processing on Data Streams", Omran Saleh, Francis Gropengieber, Heiko Betz, Waseem Mandarawi and Kai-Uwe Sattler, Proceeding UCC '13 Proceedings of the 2013 IEEE/ACM 6th International Conference on Utility and Cloud Computing, pp. 387-392.*

*Primary Examiner* — Joseph P Hirl
*Assistant Examiner* — Chi Nguy
(74) *Attorney, Agent, or Firm* — Banner & Witcoff, Ltd.; Michael A. Springs

(57) ABSTRACT

A computer system deploys monitoring agents that monitor the status and health of the computing resources. An analysis engine aggregates and analyzes event information from monitoring agents in order to support self-configuration, self-healing, self-optimization, and self-protection for managing the computer resources. If the analysis engine determines that a computing resource for a software application is approaching a critical status, the analysis engine may issue a command to that computing resource in accordance with a selected policy based on a detected event pattern. The command may indicate how the computing resource should change its behavior in order to minimize downtime for the software application as supported by that computing resource. The computer system may also support a distributed approach with a plurality of servers interacting with a central engine to manage the computer resources located at the servers.

16 Claims, 12 Drawing Sheets

(56) References Cited

U.S. PATENT DOCUMENTS

| | | |
|---|---|---|
| 7,864,037 B2 | 1/2011 | Miller |
| 8,086,547 B2 | 12/2011 | Miller |
| 8,099,452 B2 | 1/2012 | Chkodrov et al. |
| 8,112,239 B2 | 2/2012 | Elisiussen |
| 8,128,565 B2 | 3/2012 | Ohtake et al. |
| 8,565,355 B2 | 10/2013 | Ludwig |
| 8,583,586 B2 | 11/2013 | Ebadollahi et al. |
| 8,745,491 B2 | 6/2014 | Karn et al. |
| 8,745,492 B2 | 6/2014 | Karn et al. |
| 8,749,573 B2 | 6/2014 | Ali et al. |
| 2004/0037372 A1 | 2/2004 | Kuki et al. |
| 2006/0241464 A1 | 10/2006 | Ohtake et al. |
| 2006/0265406 A1 | 11/2006 | Chkodrov et al. |
| 2007/0271046 A1 | 11/2007 | Agarwala et al. |
| 2007/0294590 A1 | 12/2007 | Agarwala et al. |
| 2008/0072221 A1 | 3/2008 | Chkodrov et al. |
| 2008/0133944 A1 | 6/2008 | Jorgenson et al. |
| 2009/0106701 A1 | 4/2009 | Yalamanchi |
| 2009/0259429 A1 | 10/2009 | Elisiussen |
| 2009/0309712 A1 | 12/2009 | Miller |
| 2009/0313187 A1 | 12/2009 | Miller |
| 2010/0088165 A1 | 4/2010 | Carpio et al. |
| 2010/0199114 A1 | 8/2010 | Jorgenson et al. |
| 2011/0103525 A1 | 5/2011 | Ludwig |
| 2011/0131588 A1* | 6/2011 | Allam .................. H04L 41/065 719/318 |
| 2011/0161860 A1 | 6/2011 | Choi et al. |
| 2011/0246223 A1 | 10/2011 | Rundensteiner et al. |
| 2012/0011439 A1 | 1/2012 | Karn et al. |
| 2012/0050286 A1 | 3/2012 | Yockey |
| 2012/0131185 A1* | 5/2012 | Petersen ................ H04L 41/069 709/224 |
| 2012/0191640 A1 | 7/2012 | Ebadollahi et al. |
| 2012/0191872 A1 | 7/2012 | Prime et al. |
| 2012/0290593 A1 | 11/2012 | Asai et al. |
| 2012/0299950 A1 | 11/2012 | Ali et al. |
| 2012/0331487 A1 | 12/2012 | Mikami |
| 2013/0006903 A1 | 1/2013 | Vishwakarma |
| 2013/0067327 A1 | 3/2013 | Karn et al. |
| 2013/0103638 A1 | 4/2013 | Gupta et al. |
| 2013/0110758 A1 | 5/2013 | Jung et al. |
| 2013/0111503 A1 | 5/2013 | Tago et al. |
| 2013/0254524 A1 | 9/2013 | Snapir et al. |
| 2013/0333032 A1 | 12/2013 | Delatorre et al. |
| 2013/0339375 A1 | 12/2013 | Adayikkoth |
| 2014/0114613 A1* | 4/2014 | Wang ................. G05B 23/0205 702/185 |
| 2014/0189859 A1* | 7/2014 | Ramanan ............. G06F 21/56 726/22 |
| 2014/0201225 A1 | 7/2014 | Deshmukh et al. |
| 2014/0310564 A1* | 10/2014 | Mallige ............... G06F 11/0781 714/47.1 |

\* cited by examiner

MODIFICATION OF COMPUTING RESOURCE BEHAVIOR BASED ON AGGREGATED MONITORING INFORMATION

FIELD

Aspects described herein relate to a computer system that manages its computer resources and system operation for computer applications according to a mapped policy based on a detected event pattern.

BACKGROUND

As modern software-based systems and applications proliferate, it is important to effectively manage dynamic computer resources and service-specific user requirements. An increasingly significant requisite for software-based systems is the ability to handle resource variability, ever-changing user needs, and system faults. However, the complexity of computer systems often presents difficulties for protecting a computer system. Rectifying faults and recovering from disasters in a timely manner is often error-prone, labor-intensive, and expensive.

According to traditional approaches, standard programming practices, such as capacitating extensive error handling capabilities through exception-catching schemes, contribute towards rendering systems fault-tolerant or self-adaptive. Traditional approaches are typically tightly coupled with software code and are highly application-specific. Designs that enable software systems to heal themselves of system faults and to survive malicious attacks may significantly improve the reliability and consistency of technology in the field.

BRIEF SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure relate to methods, computer-readable media, and apparatuses that support self-management as a suite of processes by which a computer system manages its own operation, possibly without human intervention. The processes may enable the computer systems to become self-configuring (dynamic adaptation to changing environments), self-healing (the discovery and diagnosis of disruption and the corresponding reaction), self-optimizing (the monitoring and modulation of resources automatically), and self-protecting (where computer systems anticipate, detect, and protect themselves from attack).

In accordance with aspects of the embodiments, a complex event processing (CEP) system analyzes events on the fly and provides solutions that are directed to several areas within a computer system. An engine may be built from a complex array of algorithms that detects and captures events. The engine acts as a framework that may be situated in every platform upon which software applications are built. Interaction between the CEP engines from different software applications across a computer system yields high-throughput results for event analysis. This approach may consequently result in an ever-evolving, sustainable intelligent neural network that can predictive self-recuperate and withstand catastrophes.

In accordance with various aspects of the embodiments, an enterprise may deploy various agents that monitor the status and health of the computing resources of an enterprise-wide computing system. An analysis engine aggregates and analyzes monitoring information provided by monitoring agents, e.g., bandwidth/processor/memory utilization. If the analysis engine determines that a computing resource is approaching a critical status, the analysis engine may issue a command to that computing resource. The command may indicate how the computing resource should change its behavior so as to minimize downtime of an end-user service provided by that computing resource.

In accordance with various aspects of the embodiment, servers in a computer system monitor event activity for each software application that is executing on the respective server. An engine at a server monitors an event data stream for a software application as captured by agents and processes the event data stream by filtering the stream by a filter according to appropriate rules. The engine then determines the event pattern from the filtered stream, and if the determined (detected) event pattern matches one of previous (known) event patterns, the engines selects the corresponding policy to appropriately affect the server for supporting the application.

In accordance with various aspects of the embodiment, if an engine at a server is not able to match a detected event pattern from previous event patterns, the server notifies a central computer with the event information. The central computer queries other servers in the computer system to check whether the detected event pattern is known at any other server. If so, the central computer forwards returned event data (e.g., with the appropriate policy for the detected event pattern) from the positively responding server to the requesting server.

In accordance with various aspects of the embodiments, availability is achieved with a multi-layered effort. To increase the platform autonomy and overall availability, a computer system problem is identified and repaired. In order to identify and resolve problems and failures in a computer system and to increase availability and scalability, the state of the computer system is inferred from the way it looks to the outside, where agents are installed at the servers of the computer system.

In accordance with various aspects of the embodiments, an engine is built with several analytics algorithms. The engine is capable of discovering sophisticated patterns in an event stream. Based on the monitoring, the engine processes the information streams in near real-time, including and not limited to: aggregation of smaller events in order to provide a high-level view of a process such as statistics, summaries, and the like; correlation of events generated by different event sources; and long-term metrics/measurements.

In accordance with various aspects of the embodiments, a computer system may evolve and become smarter over time as more and more events are captured. Frequent event patterns in sessions are found using a priori algorithm. A new event pattern that doesn't fall under any existing pattern may be identified as a potential new event pattern. For example, access patterns may be clustered into use cases based on similarity, and a change in usage patterns may be studied. Also, user process events may be processed and correlated with other events occurring across a computer system. This approach may result in disaster recovery, system self-management, and self-healing systems in real-time or in near real-time.

In accordance with various embodiments of the disclosure, an engine monitors the patterns of system events across computer domains. Frequency of events such as central process unit (CPU) usage at a certain time of the day, logs for a failure of a process, and glitches in data center performance for a significant amount of time may be captured as events with a certain statistical probability and score. The computer system diagnoses faulty components, potentially reducing analysis time from days to seconds. Once diagnosed, the computer system may quickly take corrective action and automatically restore application services. This approach may ensure that business-critical applications and essential system services can continue uninterrupted in the event of software failures, major hardware component failures, and even software misconfiguration problems Various aspects described herein may be embodied as a method, an apparatus, or as one or more computer-readable media storing computer-executable instructions. Accordingly, those aspects may take the form of an entirely hardware embodiment, an entirely software embodiment, or an embodiment combining software and hardware aspects. Any and/or all of the method steps described herein may be implemented as computer-readable instructions stored on a computer-readable medium, such as a non-transitory computer-readable medium. In addition, various signals representing data or events as described herein may be transferred between a source and a destination in the form of light and/or electromagnetic waves traveling through signal-conducting media such as metal wires, optical fibers, and/or wireless transmission media (e.g., air and/or space).

Aspects of the disclosure have been described in terms of illustrative embodiments thereof. Numerous other embodiments, modifications, and variations within the scope and spirit of the disclosure will occur to persons of ordinary skill in the art from a review of this disclosure. For example, one of ordinary skill in the art will appreciate that the steps illustrated herein may be performed in other than the recited order, and that one or more steps illustrated may be optional in accordance with aspects of the disclosure.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of the various embodiments, reference is made to the accompanying drawings, which form a part hereof, and in which is shown by way of illustration various embodiments in which the disclosure may be practiced. It is to be understood that other embodiments may be utilized and structural and functional modifications may be made without departing from the scope and spirit of the present disclosure.

In accordance with various aspects of the embodiments, computer devices in a computer system monitor event activity for each software application that is executing on the respective computing device. An engine at a computing device monitors an event data stream for a software application as captured by agents and processes the event data stream by filtering the stream by a filter according to appropriate rules. The computing device then determines the event pattern from the filtered stream, and if the detected event pattern matches one of previous event patterns, the engine selects the corresponding policy to appropriately affect the computing device for supporting the application. If the computing device is not able to match a detected event pattern from previous event patterns, the computing device notifies a central computing device with the event information. The central computing device queries other computing devices in the computer system to check whether the detected event pattern has occurred at any other computing device in the system. If so, the central computing device forwards returned event data (e.g., with the appropriate policy for the detected event pattern) from the positively responding computing device to the requesting computing device.

Figure 1:
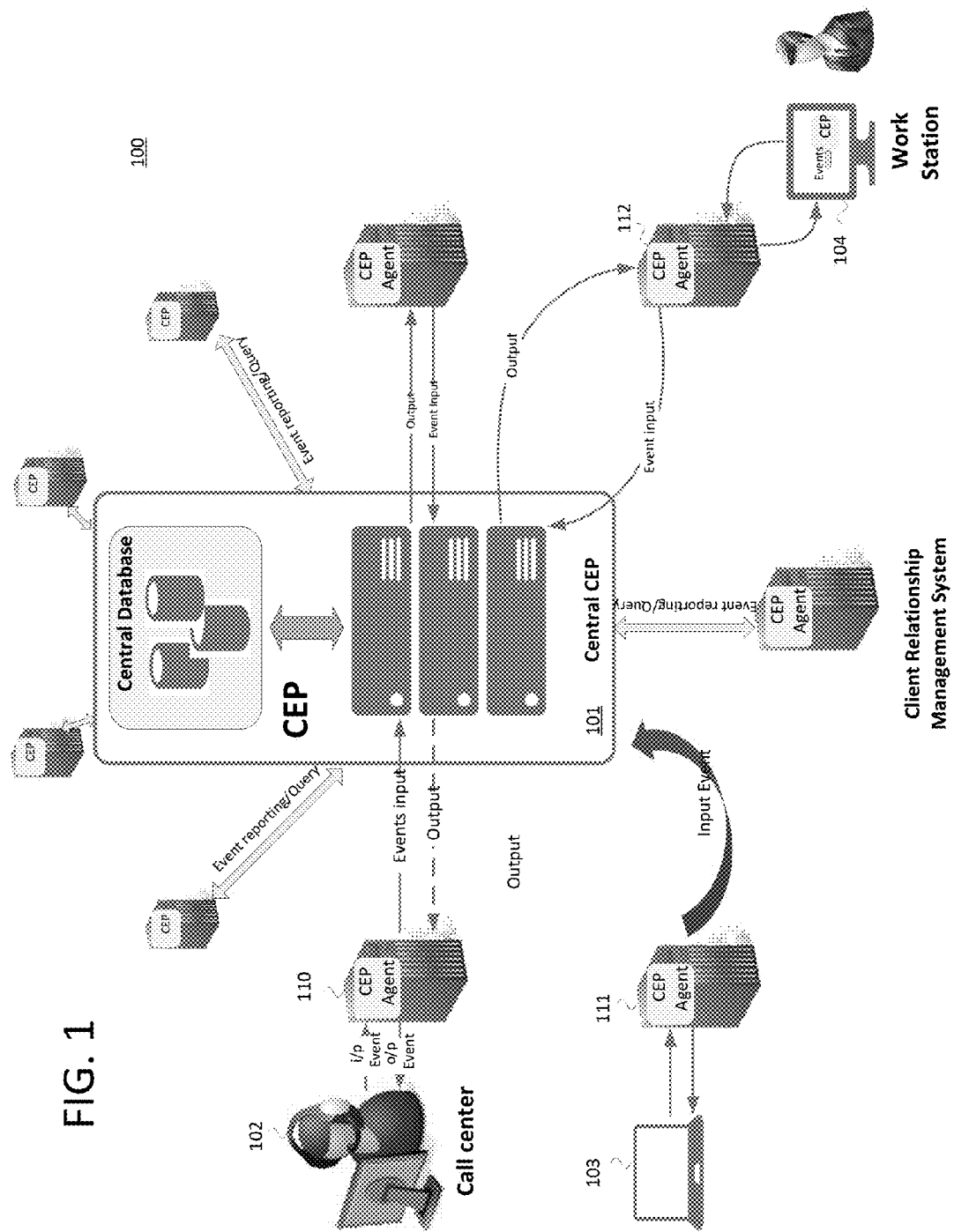
FIG. 1 shows an agent-based architecture for managing a computer system according to one or more aspects of the present architecture.

FIG. 1 shows an agent-based architecture for managing computer system 100 according to one or more aspects of the present architecture. Computer system 100 includes centralized complex event processing (CEP) engine (hub) 101 that interacts with end points 102-104, which may include application servers, desktop, mobile or back end systems. End points 102-104 are equipped with CEP agents 110-112, respectively, that execute for every action. CEP engine 101 may process event streams as sets and perform set type operations, typically using continuous queries (e.g., a structured query language (SQL) in which SQL-type queries can operate over time and buffer windows).

The multi-agent redundancy shown in computer system 100 may facilitate software adaptation with a dynamic environment. Hardware and software layers may cooperatively adapt to the changing demands of system resources and software applications to develop an integrated cross-layer adaptive system.

There may be a number of benefits for using software agents as building blocks within computer system 100, where a software agent may comprise a computer program that acts with CEP engine 101 in a relationship of agency. For example, agents may dynamically compose in system 100 when components of the system 100 are unknown until runtime. Agents can then be added to a system in runtime. Also, software can be customized over its lifetime, even by the end-users too. These and other benefits contribute to more robust systems With an aspect of the embodiments, different degrees of distributed processing in a computer system may be supported. For example, processing of event data streams from agents may be concentrated at centralized CEP engine 101 as shown in FIG. 1. However, as will be discussed with FIG. 2, event data streams may be processed at servers that interact with a centralized CEP engine according to aspect of the disclosures.

Figure 2:
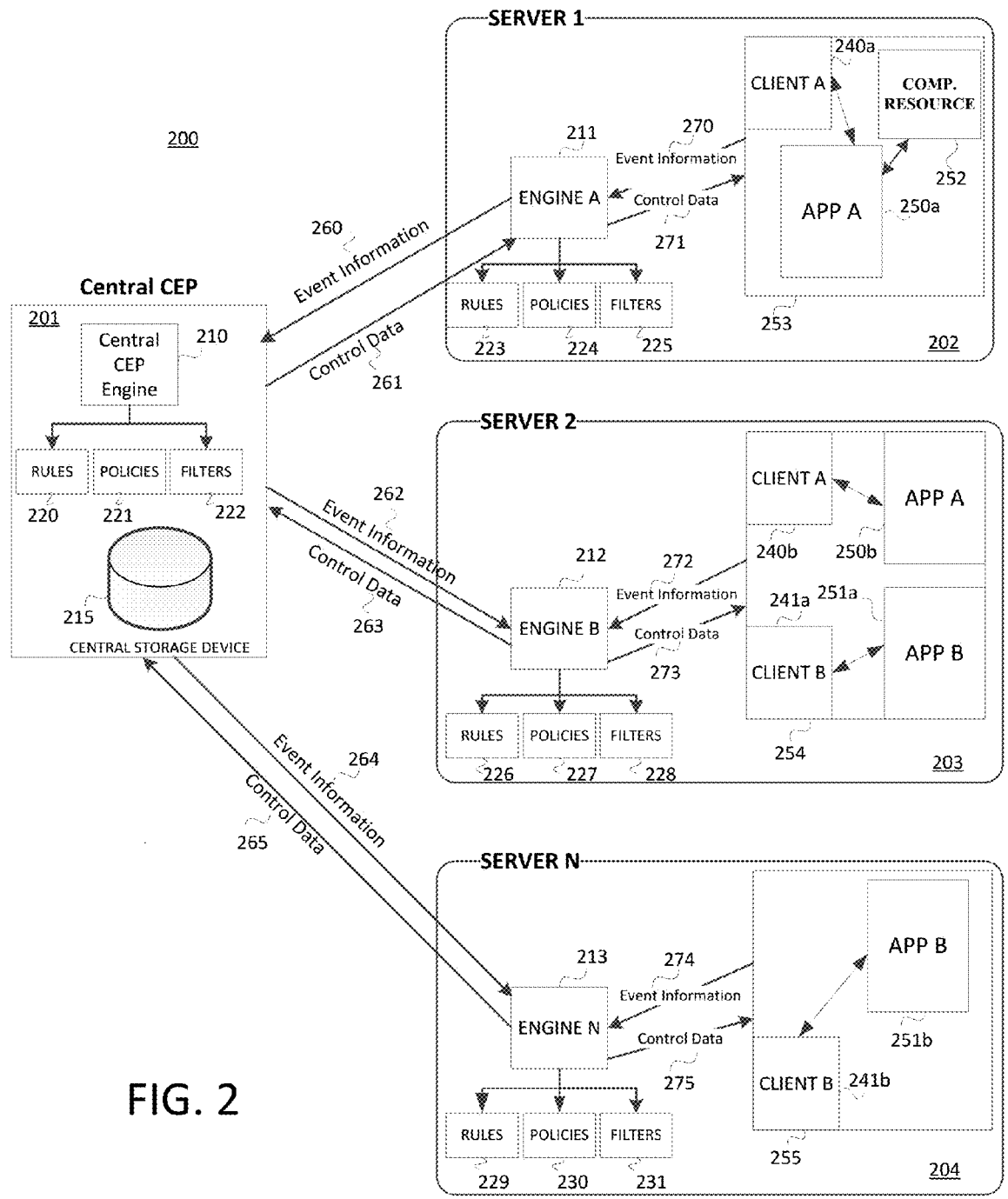
FIG. 2 shows a computer system for managing computer resources and system operation according to one or more aspects of the present disclosure.

FIG. 2 shows computer system 200 for managing computer resources according to one or more aspects of the present disclosure. According to aspects of the disclosure, computer system 200 addresses deficiencies of traditional systems including weak or no analytics, limited capabilities for detection and refinable situations, lack of standard generated alerts and automated responses, weak or no reporting (where dashboards and reports tend to be "event aggregators" and do not filter out "noise"), unscaleable centralized architecture that may be unable to manage millions of events in a heterogeneous distributed system, non-real time operation, and reactive responsiveness (i.e., not proactive).

Computer system 200 supports different software applications 250a, 250b (application a) and 251a, 251b (application b) spanning servers 202-204 that interact with central computer 201 (particularly central CEP engine 210) as will be discussed in further detail. Computer system 200 may support a software application through one or more servers. Also, while not explicitly shown, a plurality of software applications may be executed to support a client.

Software applications 250a,b and 251a,b may be directed a variety of different areas such as banking, retail, manufacturing, education, and the like. For example, software applications may support financial trading, auditing entries, order management, account management, and presenting financial information for clients 240a,240b (client A) and 241a,241b (client B). As will be further discussed, computer system 200 monitor event information associated with the different applications and may modify allocation of computer resources (e.g., computing resource 252 at server 202 according to the appropriate policy 224) for the different applications. While not explicitly shown in FIG. 2, additional computing resources (e.g., network, memory allocation of random access memory, disk storage, and the like, processing (CPU) bandwidth, and/or process queue length,) may be located at any server 202-204 in order to support software applications at the server.

Managing computer system 200 may be categorized in three stages. First, events are detected across computer system 200 in near real-time and are normalized and contextualized. Second, events are aggregated across multiple sources, correlated with historical data, and refined. Third, in response to the above event analysis, computer system 200 manages resources and processes by invoking actions in near real-time. For example, engine 211 may process event information 270 when monitoring usage of resource 252 by for application 250a at server 202 and generate control data 271 to affect the behavior of resource 252 with respect to application 250a . Similarly, engine 211 may process event information 270 for other applications and other computing resources.

Figure 5:
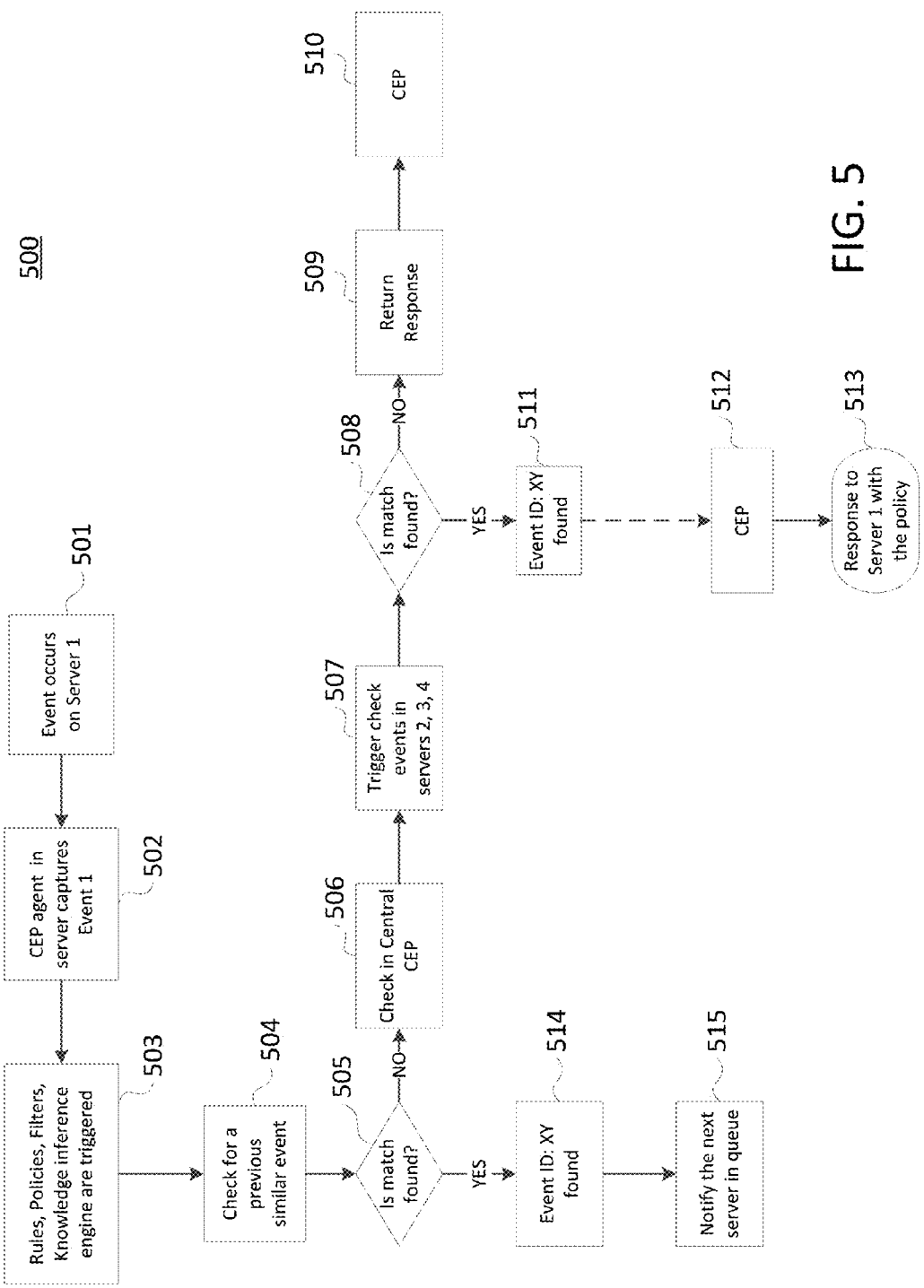
FIG. 5 shows a flowchart with a generic approach of supporting self-configuration, self-healing, self-optimization, and/or self-protection processes illustrated in FIG. 4 according to one or more aspects of the present disclosure.
Figure 6:
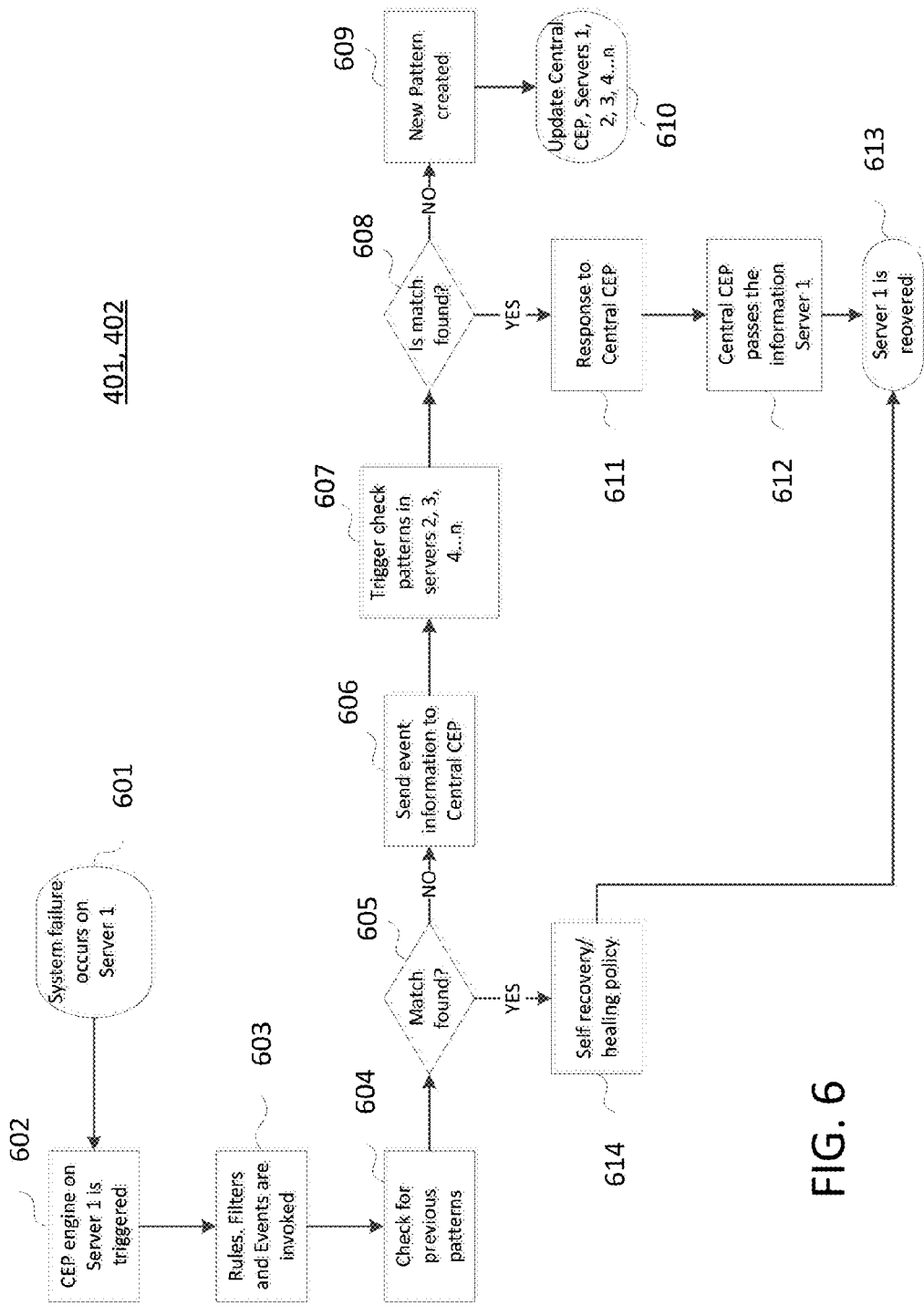
FIG. 6 shows a process supporting self-healing and/or self-protection in the computer systems illustrated in FIGS. 1-2 according to one or more aspects of the present disclosure.
Figure 7:
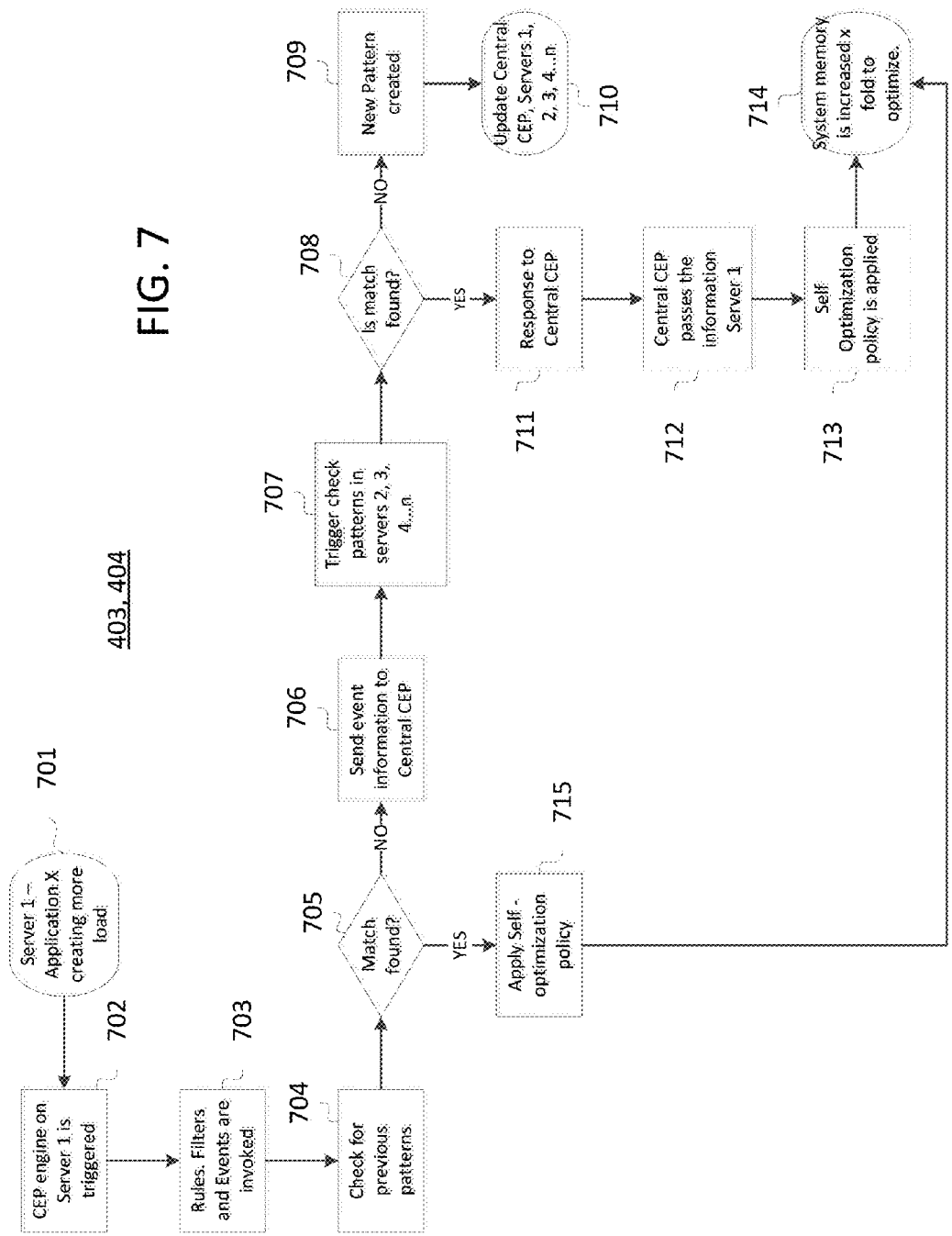
FIG. 7 shows a process supporting self-optimization and/or self-configuration in the computer systems illustrated in FIGS. 1-2 according to one or more aspects of the present disclosure.

According to an aspect of the disclosure, computer system 200 distributes the processing of event information and control of computer resources at servers 202-204 to provide semi-autonomous self-management. Consequently, each server monitors event data generated at the server and controls computing resources located at the server. If server 202, 203, or 204 cannot complete the self-management operations by itself, the server interacts with central computer 201 by providing event information 260, 262, 264 and receiving control data 261, 263, 265, respectively. This operation is further discussed with flowcharts 500-700 as shown in FIGS. 5-7, respectively.

However, in accordance with aspects of the disclosure, processing of all event information may be performed by centralize engine 210 rather than by engines 211-213. This approach typically trades response time to manage resources for the amount of distributed processing at servers 202-204. For example, as central engine assumes more responsibility for self-management, messaging between servers 202-204 and central computer 201 (e.g., event information messages 260, 262, 264 and control data 261, 263, 265) increases.

In addition to monitoring and control of computing resources (denoted as self-optimization), computer system 200 may support other self-management processes including automatic configuration of software components (denoted as self-configuration), automatic discovery and correction of faults in computer system 200, and proactive identification and protection from arbitrary attacks (denoted as self-protection).

Achieving availability may be a multi-layered effort. To increase the platform autonomy and overall availability, computer system 200 may need to identify and repair the problem and to be able to notify its environment about the system's current status. In order to identify and attend to problems and failures in the computer system and increase availability and scalability, there is a need to infer the state of the system from the way it looks to the outside, install agents on the system's servers, and actively question the service about its state. Computer system 200 may have the capability of auto-installing agents, verifying installation of agents, removing corrupted installation of agents, and upgrading installed versions of agents as computer system 200 changes its configuration (e.g., adding servers and/or software applications). This capability may be performed without human intervention and may have essentially no impact on a user.

Engines 210-213 may be is built with several analytics algorithms with the capability of discovering sophisticated event patterns in an event stream. An event pattern may comprise an ordered or unordered sequence (collection) of events, where an event may be internal or external to computer system 200, separate from other events, aggregated with other events, or correlated with other events. Applied to monitoring, computer system 200 supports near real-time processing of monitoring information streams, including among others: (1) aggregation of smaller events in order to provide a high-level view of a process such as statistics, summaries, and the like; (2) correlation of events generated by different event sources; and (3) long-term metrics/measurements. For example, if the change in the Federal funds is accompanied by other significant events at ten or more per hour in a specific region, computer system 200 may invoke self-optimization and/or self-configuration procedures for the servers in that region.

Computer system 200 may be an ever-evolving system that gets smarter over time as more and more events are captured. Frequent patterns in sessions are found using an a priori algorithm. With an aspect of the embodiments, computer system 200 may use a neural network to recognize different event patterns. A new event pattern that doesn't fall under any existing event pattern is identified as a potential new event pattern. For example, event patterns categorized as access patterns are clustered into use cases based on similarity. Over time, the change in usage patterns may be studied.

User process events can be processed and easily correlated with other events occurring across an enterprise. With respect to traditional approaches, this capability may lead to many new possibilities in disaster recovery, system self-management, and self-healing systems in real-time or in near real-time. CEP engine 210 may monitor the patterns of system events across domains. Frequency of events like CPU usage at a certain time of the day, logs for a failure of a process, glitches in data center performance for a significant amount of time are captured as events with a certain statistical probability and score. Computer system 200 diagnoses faulty components, a function that, in some cases, can reduce analysis time from days to seconds. Once diagnosed, computer system 200 may quickly take corrective action and automatically restore application services. This approach ensures that business-critical applications and essential system services can continue uninterrupted in the event of software failures, major hardware component failures, and even software misconfiguration problems.

This approach is amenable service-level agreement (SLA) contract monitoring, real-time system misuse detection, failure detection, and/or real-time monitoring of resource utilization for the purpose of steering and adaptive algorithms, such as job rescheduling.

Referring to FIG. 2, each server 202, 203, and 204 monitors event activity for each application 250a,b and 251a,b that is executing on the respective server for clients 240a,b and 241. In order to do so, Engines 211-213 monitor event data streams 270, 272, and 274 (as captured by agents 253-255, respectively) for applications executing on servers 202, 203, and 204, respectively. (With some embodiments, separate event data streams may be generated for each application executing on a server.) Engines 211-213 processes each event data stream by filtering the stream by an appropriate filter selected from filters 225, 228, and 231, respectively, according to rules selected from rules 223, 226, and 229, respectively, to obtain a filtered stream (not explicitly shown in FIG. 2.). Engines 211-213 then determines the event pattern from the filtered stream. If the detected event pattern matches one of the event patterns identifiable at servers 202-204, engines 211-213 selects the corresponding policy to appropriately affect the operation of the application executing on servers 202-204, respectively via control data 271, 273, and 275, respectively.

If engines 211-213 cannot match the detected event pattern, event information 260, 262, or 264, respectively, is sent to central computer 201for further processing of the detected event pattern. For example, central engine 210 may query central storage device 215 about the detected event pattern. With some embodiments, central engine may query other servers whether the detected event pattern previously occurred at other servers. If a match occurs, central engine 210 returns the corresponding policy to the requesting server 202-204 so that operation at the server can be appropriated affected by returning control data 261, 263, or 265 to servers 201, 202, or 203, respectively. However, if a match does not occur, a new pattern is created with the corresponding policies. A new pattern and a corresponding policy may be created based on the events captured. The events are inputs to engine 210, 211, 212, or 213 that queries for an existing pattern. If no results are returned, the engine captures the pattern as a new pattern with the adhered policy. Servers 202-204 are then updated with the new pattern and policy information. With an aspect of the disclosure, preliminary rules, policies, and filters are built on a knowledge inference engine of central engine 210. Central engine 210 becomes smarter based on the outputs received from the agents so that rules, policies and filters evolve accordingly.

Figure 3:
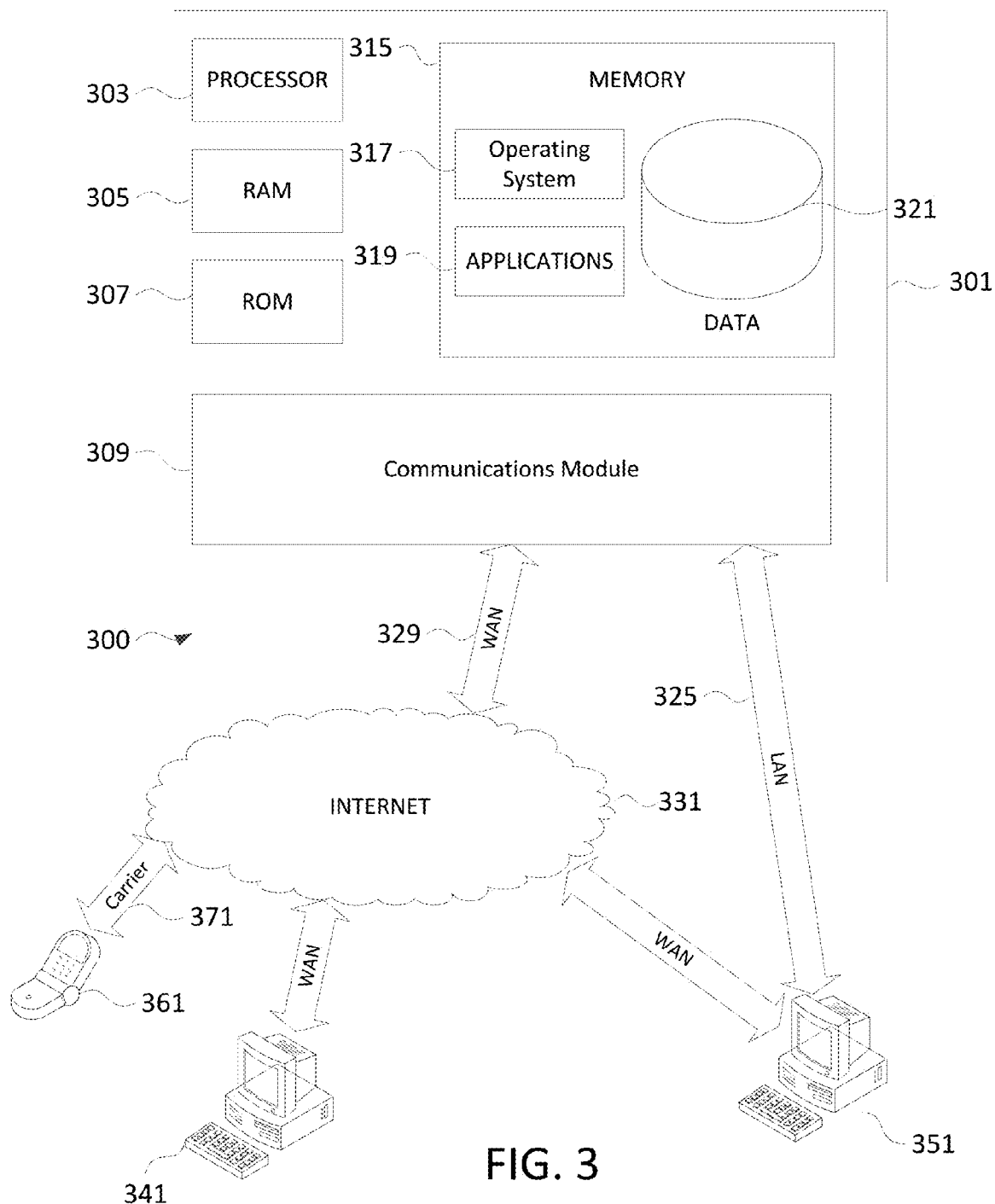
FIG. 3 shows a computing device environment for managing a computer system according to one or more aspects of the present disclosure.

FIG. 3 illustrates an example of a suitable computing system environment 300 for managing computer system 200 that may be used according to one or more illustrative embodiments. For example, as will be further discussed, computing system environment 300 may support processes 500, 600, and 700 as shown in FIGS. 5-7, respectively, to support managing computer resources (self-optimization) and system operation (self-configuration, self-protection, and self-healing) in computer system 200. The computing system environment 300 is only one example of a suitable computing environment and is not intended to suggest any limitation as to the scope of use or functionality contained in the disclosure. The computing system environment 300 should not be interpreted as having any dependency or requirement relating to any one or combination of components shown in the illustrative computing system environment 300.

The disclosure is operational with numerous other general purpose or special purpose computing system environments or configurations. Examples of well-known computing systems, environments, and/or configurations that may be suitable for use with the disclosed embodiments include, but are not limited to, personal computers (PCs), server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

With reference to FIG. 3, the computing system environment 300 may include a computing device 301 wherein the processes discussed herein may be implemented. The computing device 301 may have a processor 303 for controlling overall operation of the computing device 301 and its associated components, including random-access memory (RAM) 305, read-only memory (ROM) 307, communications module 309, and memory 315. Computing device 301 typically includes a variety of computer readable media. Computer readable media may be any available media that may be accessed by computing device 301 and include both volatile and nonvolatile media, removable and non-removable media. By way of example, and not limitation, computer readable media may comprise a combination of computer storage media and communication media.

In reference to FIG. 2, central computer 201 or server 202, 203, or 204 may comprise computing device 301.

Computer storage media include volatile and nonvolatile, removable and non-removable media implemented in any method or technology for storage of information such as computer readable instructions, data structures, program modules or other data. Computer storage media include, but is not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by computing device 301.

Communication media typically embodies computer readable instructions, data structures, program modules or other data in a modulated data signal such as a carrier wave or other transport mechanism and includes any information delivery media. Modulated data signal includes a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Computing system environment 300 may also include optical scanners (not shown). Exemplary usages include scanning and converting paper documents, e.g., correspondence and receipts to digital files.

Although not explicitly shown, RAM 305 may include one or more are applications representing the application data stored in RAM 305 while the computing device is on and corresponding software applications (e.g., software tasks), are running on the computing device 301.

Communications module 309 may include a microphone, keypad, touch screen, and/or stylus through which a user of computing device 301 may provide input, and may also include one or more of a speaker for providing audio output and a video display device for providing textual, audiovisual and/or graphical output.

Software may be stored within memory 315 and/or storage to provide instructions to processor 303 for enabling computing device 301 to perform various functions. For example, memory 315 may store software used by the computing device 301, such as an operating system 317, application programs 319, and an associated database 321. Also, some or all of the computer executable instructions for computing device 301 may be embodied in hardware or firmware.

Computing device 301 may operate in a networked environment supporting connections to one or more remote computing devices, such as computing devices 341, 351, and 361. The computing devices 341, 351, and 361 may be personal computing devices or servers that include many or all of the elements described above relative to the computing device 301. Computing device 361 may be a mobile device communicating over wireless carrier channel 371.

The network connections depicted in FIG. 3 include a local area network (LAN) 325 and a wide area network (WAN) 329, but may also include other networks. When used in a LAN networking environment, computing device 301 may be connected to the LAN 325 through a network interface or adapter in the communications module 309. When used in a WAN networking environment, the computing device 301 may include a modem in the communications module 309 or other means for establishing communications over the WAN 329, such as the Internet 331 or other type of computer network. It will be appreciated that the network connections shown are illustrative and other means of establishing a communications link between the computing devices may be used. Various well-known protocols such as TCP/IP, Ethernet, FTP, HTTP and the like may be used, and the system can be operated in a client-server or in Distributed Computing configuration to permit a user to retrieve web pages from a web-based server. Any of various conventional web browsers can be used to display and manipulate data on web pages.

Additionally, one or more application programs 319 used by the computing device 301, according to an illustrative embodiment, may include computer executable instructions for invoking user functionality related to communication including, for example, email, short message service (SMS), and voice input and speech recognition applications.

Embodiments of the disclosure may include forms of computer-readable media. Computer-readable media include any available media that can be accessed by a computing device 301. Computer-readable media may comprise storage media and communication media and in some examples may be non-transitory. Storage media include volatile and nonvolatile, removable and non-removable media implemented in any method or technology for storage of information such as computer-readable instructions, object code, data structures, program modules, or other data. Communication media include any information delivery media and typically embody data in a modulated data signal such as a carrier wave or other transport mechanism.

Although not required, various aspects described herein may be embodied as a method, a data processing system, or a computer-readable medium storing computer-executable instructions. For example, a computer-readable medium storing instructions to cause a processor to perform steps of a method in accordance with aspects of the disclosed embodiments is contemplated. For example, aspects of the method steps disclosed herein may be executed on a processor on a computing device 301. Such a processor may execute computer-executable instructions stored on a computer-readable medium.

Figure 4:
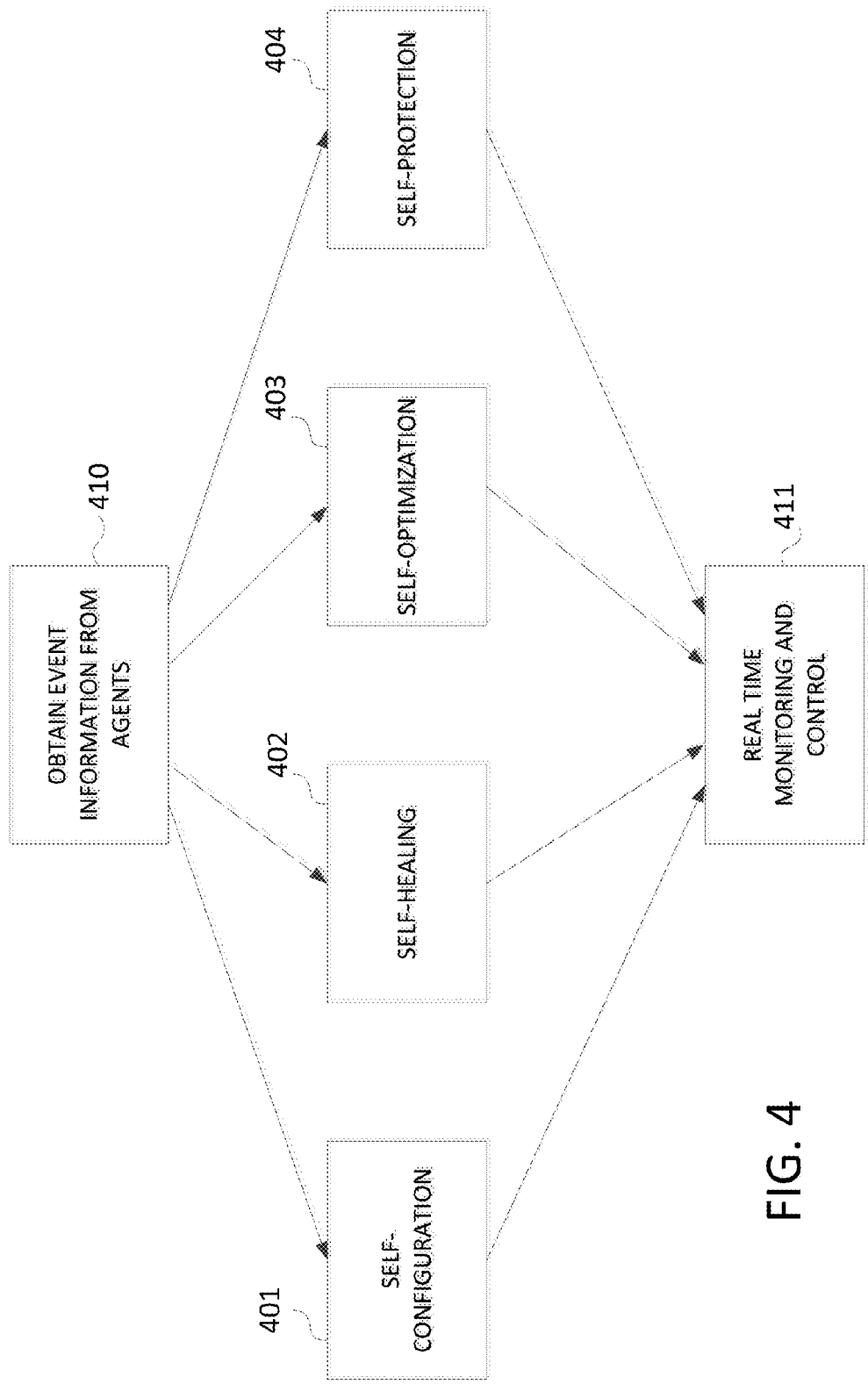
FIG. 4 shows a software architecture for managing computer resources and operation of the computer systems illustrated in FIGS. 1-2 according to one or more illustrative embodiments.

FIG. 4 shows an approach for managing computer resources and system operation of computer systems 100 and 200 illustrated in FIGS. 1-2, respectively, according to one or more illustrative embodiments. Management may be partitioned into components 401-404 corresponding to different management functions. Self-Configuration component 401 provides automatic configuration of components. Self-Healing component 402 supports automatic discovery and correction of faults and automatically applies necessary actions to bring a computer system back to normal operation. (A corresponding process supporting self-configuration and/or self-healing is shown in FIG. 6 as will be discussed.) Self-Optimization component 403 supports automatic monitoring and control of computer resources to ensure the optimal functioning with respect to the defined requirements. Self-Protection component 404 supports proactive identification and protection from arbitrary attacks on computer system 100. (A corresponding process supporting self-optimization and/or self-protection is shown in FIG. 7 as will be discussed.)

FIG. 5 shows flowchart 500 with a generic approach of supporting self-configuration, self-healing, self-optimization, and/or self-protection processes illustrated in FIG. 4 and further discussed in FIGS. 6 and 7 according to one or more aspects of the present disclosure. Process 500 may be executed in a distributed fashion by engines 201-204; however, process 500 may be executed in a centralized by central engine 201 or may be executed in a combined distributed/centralized approach.

With the following discussion, process 500 is performed at "server 1" (e.g., by engine 211) but may be performed at other servers (e.g., by engines 212 and 213 at servers 203 and 204, respectively) in reference to FIG. 2. "Central CEP" may refer to central computer 201 and/or central engine 210.

Event information is collected at block 502 for an event occurring at block 501. The event information is filtered at block 503 according to filters, rules, and policies based on the characteristics of the occurring event. At blocks 504 and 505, based on the processing of the event information at block 503, process 500 attempts to match the detected event pattern (i.e., for the event that occurred at block 501) with previous event patterns that are known (e.g., previously occurring) by engine 211. If so, the other servers are notified at blocks 514 and 515.

If a match is not detected at block 505, server 202 requests central computer 201 to further process the detected event pattern at block 506. At block 507 central engine 210 consequently queries the other servers whether the detected event previously occurred at the other servers. If a match occurs at block 508, server 202 is provided the appropriate policy information for the detected event pattern at blocks 511-513. However, if a match does occur for the detected event pattern, server 202 is informed at blocks 509-510. With some embodiments, a new pattern may be generated with the appropriate policy information at block 509.

FIG. 6 shows process 600 supporting self-healing and/or self-protection in computer systems 100 and 200 illustrated in FIGS. 1-2, respectively, and follows a similar approach as generic process 500 as shown in FIG. 5 according to one or more aspects of the present disclosure.

At block 601 an error occurs in the server that leads to system failure, and an engine situated at the server captures the event and runs rules, filters, and knowledge inference sensors at blocks 602-603.

At block 604 the engine checks for previous patterns captured by complex event processing. If the event pattern is found at block 605, the self-recovery/self-protection policy is applied at block 614 so that the system recovers at block 613. For example, the self-recovery/self-protection policy may shut down a server before it reaches 100% CPU utilization or may turn on a higher performance machine to overcome the load when a server is at 80% utilization. If pattern is not found, the engine at the server from sends an event information message to the central engine at block 606.

At block 607 the central engine triggers to check for similar patterns in different servers and may assume the form of asynchronous calls.

If any servers have similar patterns found at any servers at block 608, the central engine passes the information obtained at block 611 to the requesting server with the appropriate self-healing/self-protection policy at block 612. If no patterns are found at block 608, new event is created at block 609 and knowledge inference engine captures it for future incidents and updates the engines in the computer system at block 610.

FIG. 7 shows process 700 supporting self-optimization and/or self-configuration in computer systems 100 and 200 illustrated in FIGS. 1-2, respectively, and follows a similar approach as with generic process as shown in FIG. 5 according to one or more aspects of the present disclosure.

At block 701 an application executing at a server experiences a high load after an external event (e.g., a large drop in Dow Jones index or a change in the Federal Funds Rate). For example, if a large drop in the Dow Jones index causes a spike in load, computer system 200 separately captures the events and creates a corresponding rule and policy. If a subsequent drop in the Dow Jones Index drop occurs, computer system 200 foresees the consequences and increases the memory of servers 202-204 by a determined fold based on the previous events. The engine at the captures the event and executes rules, filters, and knowledge inference sensors at blocks 702-703.

At block 704 the engine checks for previous patterns captured by complex event processing. If an event pattern is found at block 705, the self-optimization/self-configuration policy is applied at block 715. For example, the policy may intelligently increase the memory allocated for the application x fold to optimize the system performance at block 714.

If pattern is not found at block 705, the engine from at the server sends event information to the central engine at block 706. The central engine triggers to check for similar patterns at different server at block 707. If any servers have similar patterns found as detected at block 708, the central engine passes the information obtained at block 711 to the requesting server with the self-optimization/self-configuration policy at blocks 712-713.

If no patterns are found at block 708, a new event pattern is created at block 709 and knowledge inference engine captures it for future incidents at block 710.

Figure 8:
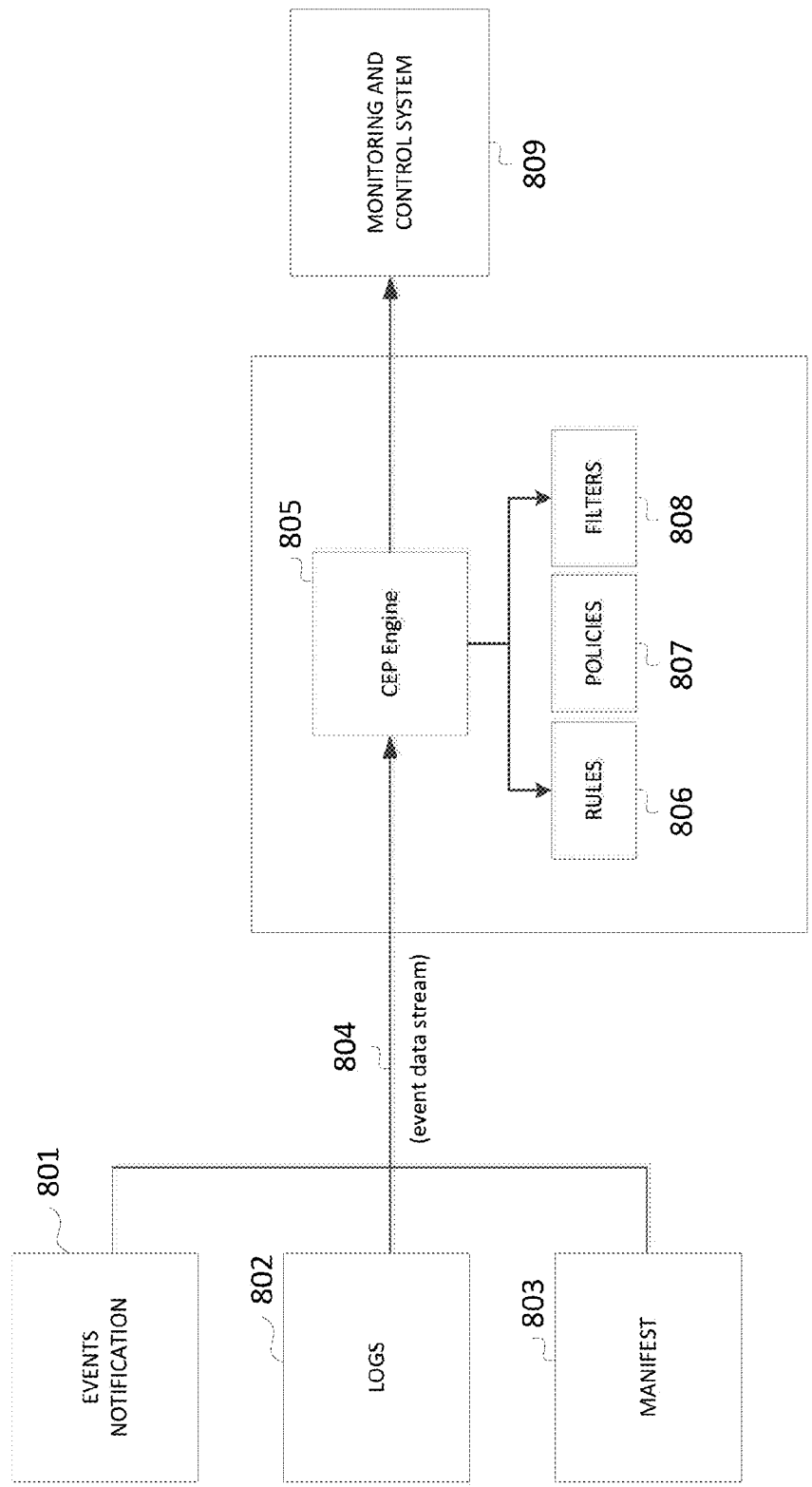
FIG. 8 shows a dynamic view of event information inputs and corresponding results presented to a monitoring and control system according to one or more aspects of the present disclosure.

FIG. 8 shows a dynamic view of event information inputs and corresponding results presented to a monitoring and control system according to one or more aspects of the present disclosure. Event notifications 801, logs 802, manifests 803, and the like are sources of event information that may be combined into event data stream 804 to the CEP engine 805 (e.g., corresponding to engines 210-214 as shown in FIG. 2). Engine 805 triggers the corresponding rules 806/policies 807/filters 808 to process event data stream 804 and send meaningful solution to the end system/user via monitoring and control system 809. For example, engine 805 may select portions of event data stream 804 according the filter 808 and correlate different event data according to rules 806. Monitoring and control system 809 may present processed event information to a user (e.g., via computer 341 or 351 or via wireless device 361 as shown in FIG. 3) and/or determine the appropriate policy to affect operation of the computer system as previously discussed. For example, monitoring and control system 809 may comprise key performance indicator (KPI) dashboards, pagers, and monitoring devices that may be configured as targets in computer system 200.

Figure 9:
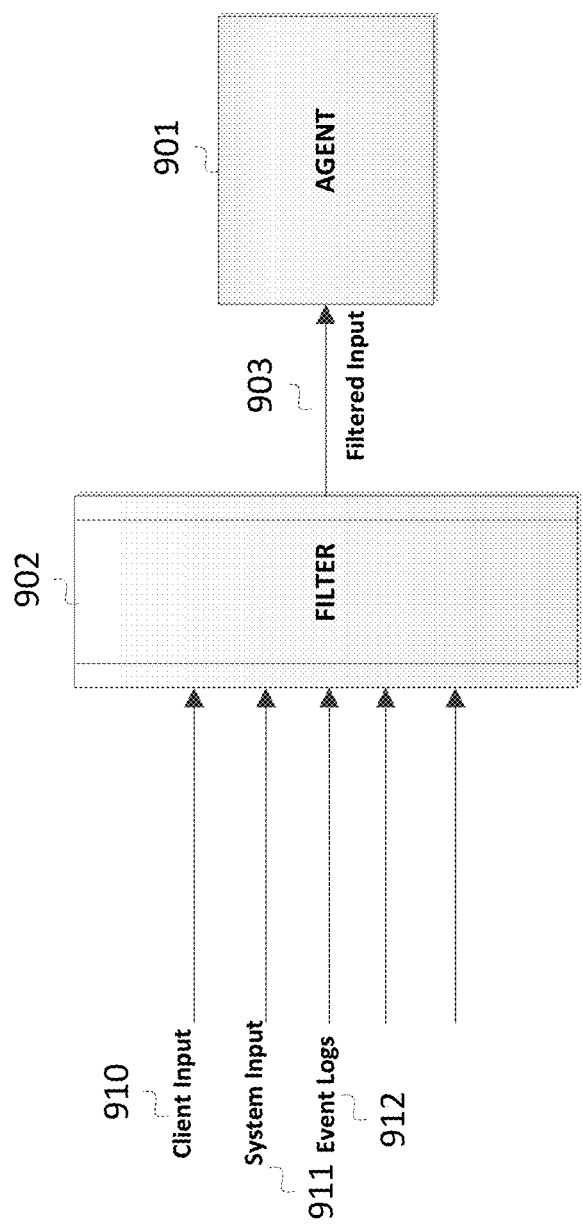
FIG. 9 shows event inputs that are filtered and processed by an agent according to one or more aspects of the present disclosure.

FIG. 9 shows event inputs (client input 910, system input 911, and event logs 912) that are filtered by filter 902 and processed by agent 901 according to one or more aspects of the present disclosure. With some embodiments, filter 902 is implemented in the engine (e.g., engine 210, 211, 212, or 213) in which rules are triggered to obtain filtered input 903. For example, the rules may invoke a selection of inputs and portions of inputs 910-912, a correlation between inputs 910-912, and statistic characterization of inputs 910-912.

Figure 10:
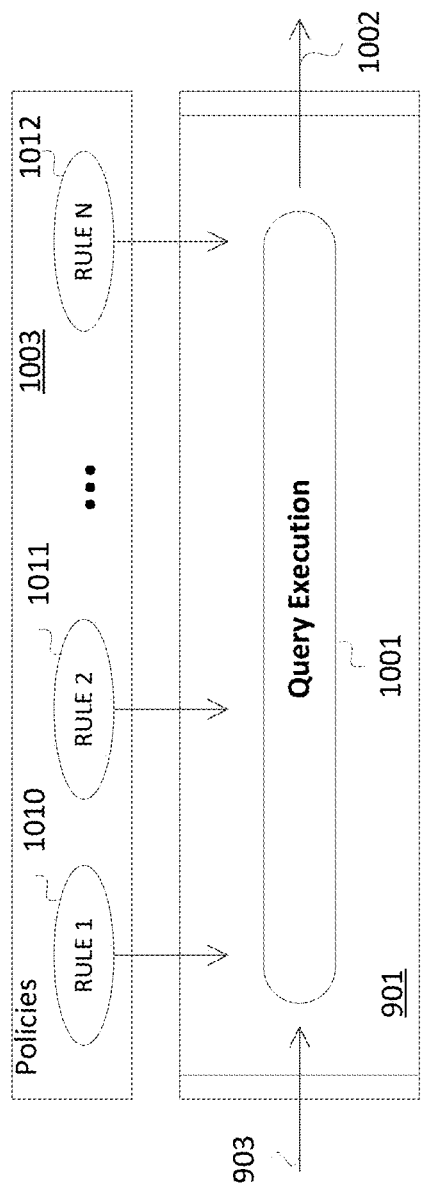
FIG. 10 shows an agent responsive to a data query for filtered event data according to one or more aspects of the present disclosure.

FIG. 10 shows agent 901 responsive to a data query for filtered event data 903 according to one or more aspects of the present disclosure. Filtered input request 903 flows through query execution component 1001 to obtain query output 1002. Rules 1010-1012 and policies 1003 are applied and create meaningful data.

Figure 11:
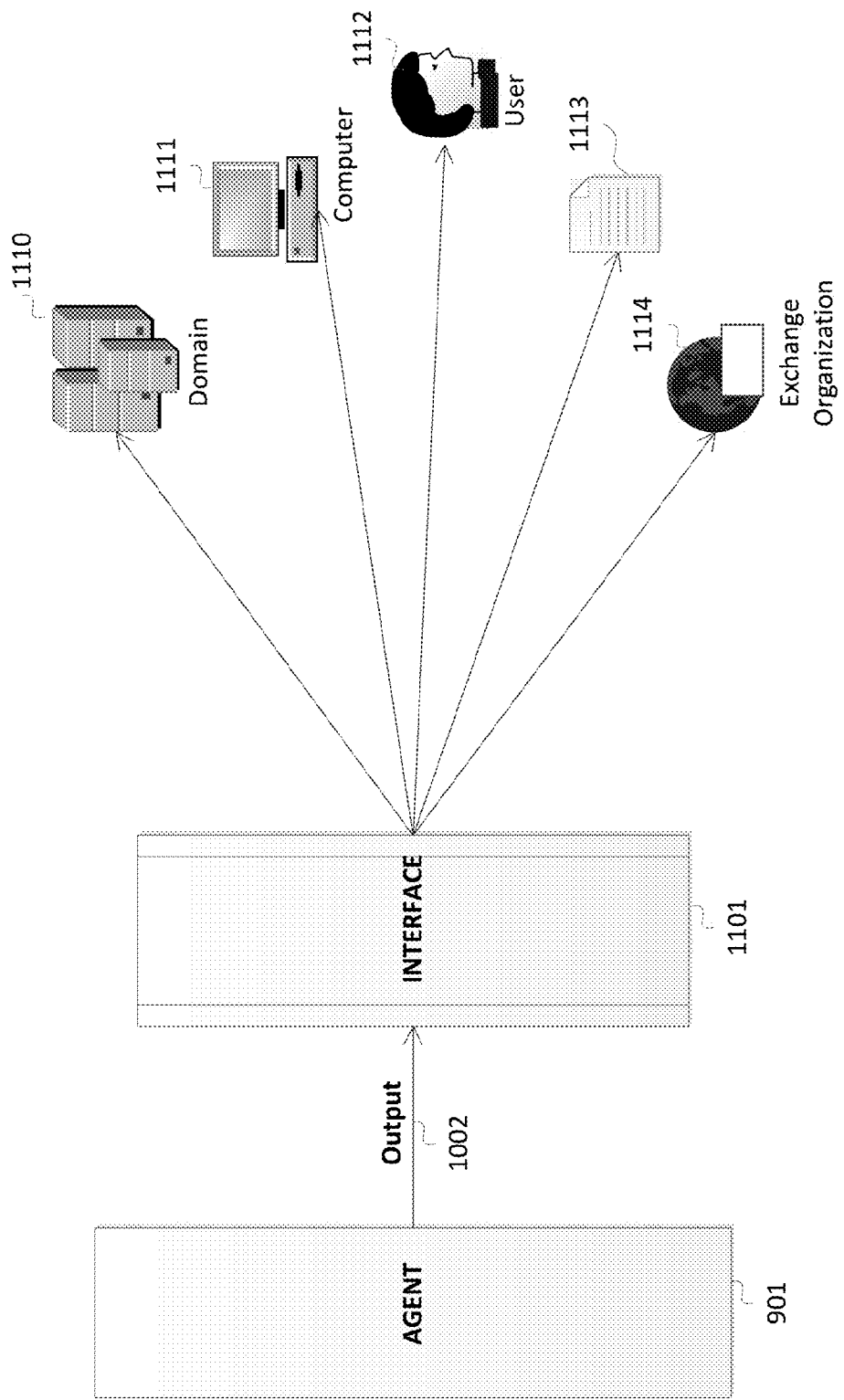
FIG. 11 shows queried data that is sent by the agent through a data interface to specific targets according to one or more aspects of the present disclosure.

FIG. 11 shows queried data 1002 that is sent by agent 901 that is forwarded to specific targets 1110-1114 through data interface 1101 according to one or more aspects of the present disclosure. Queried data 1002 assists in providing creates meaningful data that is sent as output 1002 from agent 901. Interface 1101 picks up and sends the data to specific targets 1110-1114. For example, CEP engine 101 (as shown in FIG. 1) may process event streams as sets and perform set type operations, typically using continuous queries (e.g., a structured query language (SQL) in which SQL-type queries can operate over time and buffer windows).

Figure 12:
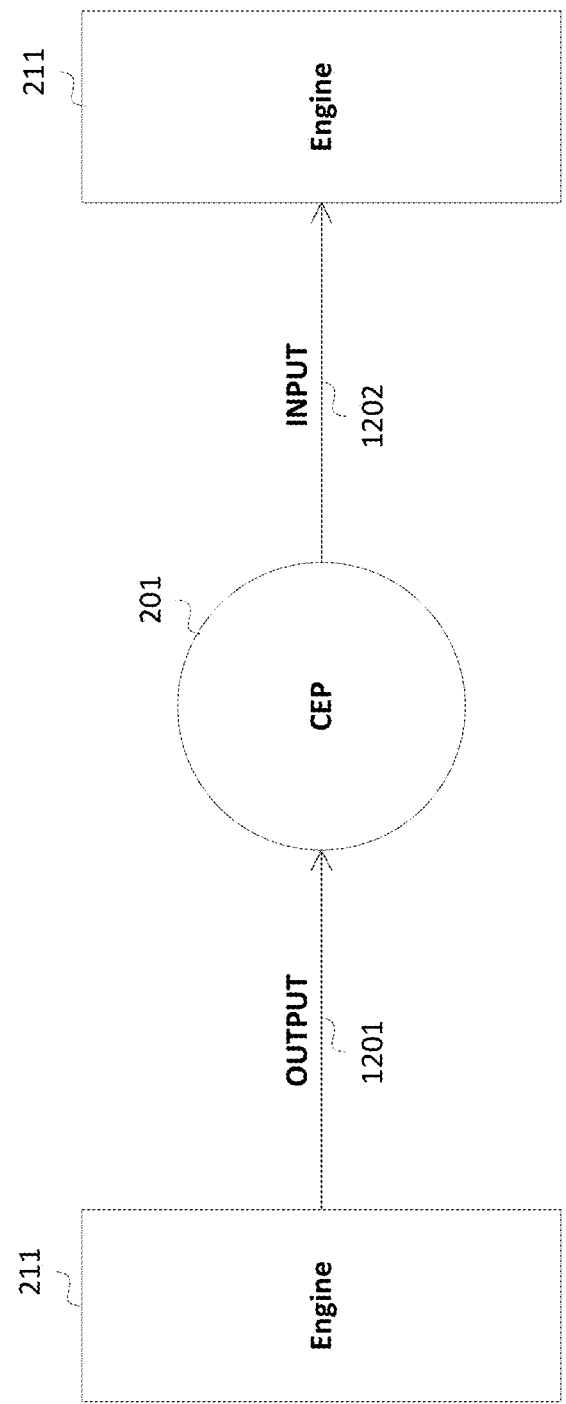
FIG. 12 shows output event data from an engine that is input event data to itself according to one or more aspects of the present disclosure.

FIG. 12 shows output event data 1201 from an engine 211 that is input event data 1202 to itself according to one or more aspects of the present disclosure. For example, if the CPU usage at engine 211 is greater than 60%, engine 211 raises an occurrence of a significant event at output 1201 that is indicated at input 1202. If engine 211 experiences significant events at a rate of 10 per hour or more, engine 211 shuts down server 202 and brings the next in queue into operation.

Aspects of the embodiments have been described in terms of illustrative embodiments thereof. Numerous other embodiments, modifications and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the embodiments. They may determine that the requirements should be applied to third party service providers (e.g., those that maintain business processes on behalf of the company).

What is claimed is:

1. A computer system comprising:
a second computing device; and
a first computing device comprising:
  a first memory device;
  a resource allocation module;
  a first shared computing resource; and
  a first processing device coupled to the first memory device and configured to perform, based on instructions stored in the first memory device:
    in response to an occurrence of an external event, managing a first load level and a second load level of the first shared computing resource by a first software application and a second software application, respectively;
    mapping a plurality of policies to a plurality of previous event patterns, wherein the plurality of policies comprises a first policy and a second policy;
    determining a first load level and a second load level of the first shared computing resource by the first software application and the second software application, respectively, that are executing on the first computing device;
    when the first load level exceeds a first predetermined threshold,
      obtaining a first event data stream for the first software application;
      selecting a first filter from a plurality of filters for the first software application;
      transforming the first event data stream with the first filter to obtain a first detected event pattern;
      detecting whether the first detected event pattern comprises an ordered sequence of events; and
      when the first detected event pattern matches a first previous event pattern of the plurality of previous event patterns, instructing the resource allocation module to apply the first policy to the first software application for the first shared computing resource, and wherein detecting whether the first detected event pattern comprises the ordered sequence of events before instructing the resource allocation to apply the first policy; and
    when the second load level exceeds a second predetermined threshold,
      obtaining a second event data stream for the second software application;
      selecting a second filter from a plurality of filters for the second software application, wherein the second filter is different from the first filter;
      transforming the second event data stream to obtain a second detected event pattern; and
      when the second detected event pattern matches a second previous event pattern of the plurality of previous event patterns, instructing the resource allocation module to apply the second policy to the second software application for the first shared computing resource;
      wherein when the first detected event pattern does not match any of the plurality of previous event patterns, sending an event request to the second computing device, wherein the event request includes event information indicative of the first detected event pattern; and receiving an event response from the second computing device, wherein the event response is indicative of whether the first detected event pattern matches any event pattern that has occurred in the computer system.

2. The computer system of claim 1, further comprising: a third computing device; wherein the second computing device includes: a second memory device; and a second processing device coupled to the second memory device and configured to perform, based on instructions stored in the second memory device: receiving the event request from the first computing device; generating an inquiry whether the first detected event pattern occurred at the third computing device; and when the inquiry is indicative that the first detected event pattern previously occurred at the third computing device, returning the event response with a returned policy to the first computing device.

3. The computer system of claim 2, wherein the third computing device includes: a third memory device; and a third processing device coupled to the third memory device and configured to perform, based on instructions stored in the third memory device: when the first detected event pattern matches one of a plurality of previously occurring event patterns at the third computing device, returning the event response with the returned policy.

4. The computer system of claim 2, wherein the second processing device is further configured to perform, based on instructions stored in the second memory device: when the inquiry is not indicative that the first detected event pattern did not previously occur at any computing device in the computer system, creating a new event pattern; and updating the first computing device and the third computing device with the new event pattern.

5. The computer system of claim 4, wherein the second processing device is further configured to perform, based on instructions stored in the second memory device: determining a new policy for the new event pattern.

6. The computer system of claim 1, wherein the first processing device is further configured to perform, based on instructions stored in the first memory device: when the first detected event pattern matches a fourth previous event pattern of the plurality of previous event patterns, applying a fourth policy to the first software application for the first shared computing resource, wherein the plurality of policies includes the fourth policy.

7. The computer system of claim 1, wherein: the first shared computing resource comprises a computer memory resource; and the first processing device is further configured to perform, based on instructions stored in the first memory device: adjusting an allocation of the computer memory resource for the first software application in accordance with the first policy.

8. The computer system of claim 1, wherein the first processing device is further configured to perform, based on instructions stored in the first memory device: filtering an input stream for the first shared computing resource by the first software application; and obtaining the first event data stream from the filtered input stream.

9. The computer system of claim 1, wherein the first processing device is further configured to perform: receiving an indication indicative that an external event has occurred; correlating the external event to one of a plurality usage patterns;

and applying a corresponding policy associated with said one usage pattern to the first software application for the first shared computing resource.

10. The computer system of claim 1, wherein the first processing device is further configured to perform, based on instructions stored in the first memory device: determining a third load level of a second shared computing resource by the first software application that is executing on the first computing device; when the third load level exceeds a third predetermined threshold, obtaining a third event data stream for the first software application; processing the third event data stream to obtain a third detected event pattern; and when the third detected event pattern matches a third previous event pattern of the plurality of previous event patterns, applying a third policy to the first software application for the second shared computing resource.

11. The computer system of claim 1, wherein the second computing device comprises a second processing device and a second memory device and wherein the second processing device is further configured to perform, based on instructions stored in the second memory device: managing a fourth load level of the first shared computing resource for a third software application, wherein the third software application is executing on the second computing device and wherein the first shared computing resource is located on the first computing dev ice; when the fourth load level exceeds a fourth predetermined threshold, obtaining a fourth event data stream for the third software application; selecting a third filter from a plurality of filters for the third software application; transforming the fourth event data stream with the third filter to obtain a fourth detected event pattern; and when the fourth detected event pattern matches a fourth previous event pattern of the plurality of previous event patterns, applying a fourth policy to the third software application for the first shared computing resource.

12. A computer-assisted method for managing a computer system, the method comprising:
in response to an occurrence of an external event, determining, by a first computing device, a first load level and a second load level of a first shared computing resource by a first software application and a second software application, respectively, that are executing on the first computing device;
when the first load level exceeds a first predetermined threshold,
obtaining, by the first computing device, a first event data stream for the first software application;
selecting a first filter from a plurality of filters for the first software application;
transforming, by the first computing device, the first event data stream with the first filter to obtain a first detected event pattern;
detecting whether the first detected event pattern comprises an ordered sequence of events;
when the first detected event pattern matches any event pattern of a plurality of previous event patterns accessed from a coupled memory device, applying, by the first computing device, a first policy to the software application for the first shared computing resource, and wherein detecting whether the first detected event pattern comprises the ordered sequence of events before applying the first policy;
when the first detected event pattern does not match said any event pattern, sending, by the first computing device, a first event request to a second computing device, wherein the first event request includes event information indicative of the first detected event pattern; and
receiving, by the first computing device, a first event response from the second computing device, wherein the first event response is indicative of whether the first detected event pattern matches a first previously occurring event pattern that has occurred in the computer system; when the second bad level exceeds a second predetermined threshold,
obtaining, by the first computing device, a second event data stream for the second software application;
selecting a second filter from a plurality of filters for the second software application, where in the second filter is different from a first filter;
transforming, by the first computing device, the second event data stream with the second filter to obtain a second detected event pattern; and
when the second detected event pattern matches one of the plurality of previous event patterns accessed from a coupled memory device, applying, by the first computing device, a second policy to the second software application for the first shared computing resource.

13. The method of claim 12, further comprising: when the first event response is indicative that the first detected event pattern did not previously occur at any computing device in the computer system, creating a new event pattern; updating the first computing device with the new event pattern; and determining a new policy for the new event pattern.

14. The method of claim 12, further comprising: triggering a second analysis of a third event data stream when a system failure at the first computing device is detected; processing the third event data stream to obtain a third detected event pattern; when the third detected event pattern matches a third previous event pattern of the plurality of previous event patterns, applying a third policy to recover from the system failure at the first computing device; when the third detected event pattern does not match any of the plurality of previous event patterns, sending a second event request to a second computing device, wherein the event request includes event information indicative of whether the third detected event pattern has occurred in the computer system; and receiving a second event response from the second computing device, wherein the event response is indicative whether the third detected event pattern matches a third previously occurring event pattern that has occurred in the computer system.

15. The method of claim 12, further comprising: determining a third load level of a second shared computing resource by a third software application that is executing on the first computing device; when the third load level exceeds a third predetermined threshold, obtaining a third event data stream for the third software application; selecting a third filter from the plurality of filters, wherein the third filter is different from the first and second filters; transforming the third event data stream with the third filter to obtain a third detected event pattern; and when the third second detected event pattern matches any event pattern of the plurality of previous event patterns, applying a third policy to the third software application for the second shared computing resource.

16. A non-transitory computer-readable storage medium storing computer-executable instructions that, when executed, cause a processor at least to perform operations comprising:
in response to an occurrence of an external event, detecting a first load level and a second load level of a shared computing resource by a first software application and a second software application, respectively, wherein the first and second applications are executing on a first computing device;

when the first bad level exceeds a first predetermined threshold,
    obtaining an analysis of a first event data stream for the first software application;
    transforming the first event data stream with a first filter for the shared computing resource to obtain a first detected event pattern;
    detecting whether the first detected event pattern comprises an ordered sequence of events;
    when the first detected event pattern matches a first previous event pattern of a plurality of previous event patterns, applying a first policy to the first software application for the shared computing resource, and wherein detecting whether the first detected event pattern comprises the ordered sequence of events before applying the first policy;
    when the first detected event pattern does not match any event pattern, sending, by the first computing device, a first event request to a second computing device, wherein the first event request includes event information indicative of the first detected event pattern;
    receiving, by the first computing device, a first event response from the second computing device, wherein the first event response is indicative of whether the first detected event pattern matches a first previously occurring event pattern that has occurred in a computer system; and when the second load level exceeds a second predetermined threshold,
    obtaining a second event data stream for the second software application;
    transforming the second event data stream with a second filter for the shared computing resource to obtain a second detected event pattern; and
    when the second detected event pattern matches a second previous event pattern of the plurality of previous event patterns, applying a second policy to the second software application for the shared computing resource.

* * * * *